(12) United States Patent
Tabuchi et al.

(10) Patent No.: US 7,373,390 B2
(45) Date of Patent: *May 13, 2008

(54) DISK SUBSYSTEMS AND THEIR INTEGRATED SYSTEM

(75) Inventors: Hideo Tabuchi, Odawara (JP); Masafumi Nozawa, Odawara (JP); Akinobu Shimada, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 868 days.

This patent is subject to a terminal disclaimer.

(21) Appl. No.: 10/687,637

(22) Filed: Oct. 20, 2003

(65) Prior Publication Data

US 2004/0103164 A1 May 27, 2004

Related U.S. Application Data

(63) Continuation of application No. 09/513,932, filed on Feb. 28, 2000, now Pat. No. 7,167,902.

(30) Foreign Application Priority Data

Apr. 26, 1999 (JP) ................................ 11-117670

(51) Int. Cl.
*G06F 15/16* (2006.01)
*G06F 12/00* (2006.01)
*G06F 13/00* (2006.01)

(52) U.S. Cl. ...................... 709/211; 711/114; 711/162

(58) Field of Classification Search ................ 709/202, 709/211; 711/114, 118, 161–2, 165; 714/5–6, 714/13

See application file for complete search history.

(56) References Cited

U.S. PATENT DOCUMENTS 4,875,159 A * 10/1989 Cary et al. .................. 707/203
5,133,065 A * 7/1992 Cheffetz et al. ............... 714/2
5,155,845 A * 10/1992 Beal et al. ...................... 714/6

(Continued)

FOREIGN PATENT DOCUMENTS

EP          0617362          9/1994

(Continued)

OTHER PUBLICATIONS

Digital Equipment Corporation, "Digital Storage SCSI Bus Extenders/Converters and UltraSCSI Hubs", version 2.0, released Mar. 2, 1998, pp. 7.1-7-5.

(Continued)

*Primary Examiner*—George C. Neurauter, Jr.
(74) *Attorney, Agent, or Firm*—Mattingly, Stanger, Malur & Brundidge, P.C.

(57) ABSTRACT

An asynchronous remote copy system which can ensure the data renewal order and data integrity of the disk subsystems. The system provides for data mirroring by a main center having a gateway and a remote center having a gateway, and storage systems in each center connected to the corresponding gateway. Data is mirrored through synchronous type remote copy between volumes of the storage systems of each center. The gateway of the main center sends the renewal data to the gateway of the remote center in accordance with the order of renewal of volumes, to make the gateway of the remote center reflect the renewal data upon the volumes thereof through asynchronous type remote copy.

19 Claims, 5 Drawing Sheets

U.S. PATENT DOCUMENTS

| | | | |
|---|---|---|---|
| 5,257,352 A | 10/1993 | Yamamoto | |
| 5,375,232 A | 12/1994 | Legvold et al. | |
| 5,379,418 A * | 1/1995 | Shimazaki et al. | 714/11 |
| 5,390,327 A | 2/1995 | Lubbers et al. | 714/7 |
| 5,446,871 A | 8/1995 | Shomler et al. | |
| 5,537,533 A * | 7/1996 | Staheli et al. | 714/5 |
| 5,544,347 A | 8/1996 | Yani et al. | |
| 5,555,371 A * | 9/1996 | Duyanovich et al. | 714/13 |
| 5,577,222 A | 11/1996 | Micka et al. | |
| 5,592,618 A | 1/1997 | Micka et al. | |
| 5,615,329 A | 3/1997 | Kern et al. | |
| 5,623,599 A * | 4/1997 | Shomler | 714/18 |
| 5,657,440 A * | 8/1997 | Micka et al. | 714/16 |
| 5,720,029 A | 2/1998 | Kern et al. | 714/20 |
| 5,742,792 A | 4/1998 | Yanai et al. | 711/162 |
| 5,745,753 A * | 4/1998 | Mosher, Jr. | 707/202 |
| 5,799,141 A | 8/1998 | Galipeau et al. | 714/13 |
| 5,845,328 A | 12/1998 | Maya et al. | |
| 5,870,537 A | 2/1999 | Kern et al. | |
| 5,893,140 A | 4/1999 | Vahalia et al. | 711/118 |
| 5,937,414 A | 8/1999 | Souder et al. | 707/203 |
| 5,949,970 A | 9/1999 | Sipple | |
| 6,044,444 A | 3/2000 | Ofek | |
| 6,052,799 A | 4/2000 | Li et al. | 714/13 |
| 6,131,148 A * | 10/2000 | West et al. | 711/162 |
| 6,157,991 A | 12/2000 | Arnon | 711/161 |
| 6,161,165 A | 12/2000 | Solomon et al. | 711/114 |
| 6,173,293 B1 | 1/2001 | Thekkath et al. | 707/201 |
| 6,178,521 B1 | 1/2001 | Filgate | 714/6 |
| 6,182,166 B1 * | 1/2001 | Shklarsky et al. | 710/33 |
| 6,185,659 B1 * | 2/2001 | Milillo et al. | 711/137 |
| 6,260,124 B1 | 7/2001 | Crockett et al. | |
| 6,282,610 B1 * | 8/2001 | Bergsten | 711/114 |
| 6,324,654 B1 | 11/2001 | Wahl et al. | 714/6 |
| 6,408,370 B2 | 6/2002 | Yamamoto et al. | |
| 6,415,373 B1 | 7/2002 | Peters et al. | 711/167 |
| 6,446,175 B1 * | 9/2002 | West et al. | 711/162 |
| 6,535,967 B1 * | 3/2003 | Milillo et al. | 711/162 |
| 6,535,994 B1 | 3/2003 | Kedem | 714/6 |
| 6,539,462 B1 | 3/2003 | Mikkelsen et al. | |
| 7,167,902 B1 * | 1/2007 | Tabuchi et al. | 709/211 |
| 2001/0010070 A1 | 7/2001 | Crockett et al. | |
| 2003/0782526 | 9/2003 | Mikkelsen et al. | |

FOREIGN PATENT DOCUMENTS

| | | |
|---|---|---|
| EP | 0671666 A2 | 9/1995 |
| EP | 0672885 | 9/1995 |
| EP | 0724223 | 7/1996 |
| EP | 0902370 A2 | 3/1999 |
| JP | 6290125 | 10/1994 |
| JP | 09-325917 | 12/1997 |
| JP | 11-85408 | 3/1999 |
| WO | 9400816 | 1/1994 |
| WO | 9820419 | 5/1998 |

OTHER PUBLICATIONS

Digital Equipment Corporation "Digital Equipment Announces StorageWorks: Capacity Breakthrough for DSSI Systems Customers", released Mar. 8, 1994.

"IBM 3990/9390 Storage Control", 9th Edition Oct. 1996, pp. 23-26 and 78-89.

U.S. Appl. No. 09/526,948, filed Mar. 16, 2000, Tabuchi et al.

* cited by examiner

DISK SUBSYSTEMS AND THEIR INTEGRATED SYSTEM

The present application is a continuation of application Ser. No. 09/513,932, filed Feb. 28, 2000, now U.S. Pat. No. 7,167,902, the contents of which are incorporated herein by reference.

BACKGROUND OF THE INVENTION

The present invention relates to external storage devices for storing data in a computer system and to their integrated system, and more particularly to remote copy techniques for mirroring data between remote external storage devices (disk subsystems) without involving an upper hierarchical apparatus or host computer, by interconnecting remote external storage devices and other remote external storage devices. The disk subsystem is herein intended to mean a control unit for controlling data transfer to and from an upper hierarchical apparatus and a storage device having disks for storing data or a storage device having an internal buffer.

External storage systems incorporating a so-called remote copy function have already been in practical use, in which data is mirrored and stored in disk subsystems of a main center and a remote center.

Such prior art has various issues to be solved because the remote copy function is realized by involving host computers.

"Synchronous Type and Asynchronous Type"

The remote copy function is mainly classified into two types, a synchronous type and an asynchronous type.

The synchronous type executes the following process sequence. When a disk subsystem is instructed by a host computer (upper hierarchical apparatus) of a main center to renew (write) data and if the disk subsystem is assigned the remote copy function, a renewal process completion notice is issued to the host computer of the main center only after the instructed data renewal (write) is completed for a corresponding disk subsystem in a remote center. A time delay (transmission time and the like) is generated in accordance with a geographical distance between the main center and remote center and the performance of a data transmission line therebetween. If the transmission time of the synchronous type is taken into consideration, several tens Km is a practical limit of a distance to a remote site.

In the synchronous type, the data contents in disk subsystems in the main and remote centers are always consistent from a macro viewpoint. Therefore, even if the function of the main center is lost by accidents or the like, the data contents immediately before the accidents are perfectly retained in the disk subsystems of the remote center and the process can be resumed quickly at the remote center. The term "always consistent from the macro viewpoint" means that during the execution of the synchronous type function, although the data contents may be different in terms of a process time (•sec, msec) of magnetic disk devices and electronic circuits, the data contents are always the same at the time of data renewal completion. This is because the renewal process at the main center cannot be completed unless the renewal data is completely reflected upon the remote center. Therefore, in some cases, particularly if a distance between the main and remote centers is long and the data transmission line is congested, the access performance to a disk subsystem in the main center is considerably degraded.

In contrast, the asynchronous type executes the following process sequence. When a disk subsystem is instructed by a host computer of a main center to renew (write) data and even if this data is to be remotely copied, a renewal process completion notice is issued to the host computer of the main center immediately after the data renewal process for the disk subsystem in the main center is completed, to thereafter execute the data renewal (reflection) of the disk subsystem in the remote center, asynchronously with the data renewal in the main center. Since the data renewal is completed in a process time required by the main center, there is no transmission delay time or the like to be caused by storing the data in the remote center.

In the asynchronous type, the data contents in a disk subsystem of the remote center are not always consistent with those in the main center. Therefore, if the function of the main center is lost by accidents or the like, the data still not reflected upon the remote center is lost. However, an access performance of a disk subsystem in the main center can be maintained at the level when the remote copy function is not executed.

In order to back up data so as not to be lost by natural disasters such as earthquakes, it is necessary to set the distance between the main and remote centers to about 100 km to several tens km. Although it is possible to use a high speed communication line, for example, of a 100 Mbit/sec to 300 Mbit/sec class for the remote copy function, an expensive line subscription fee is incurred upon a customer of the disk subsystem, and this approach is not economically suitable.

"Order Integrity"

There is another problem different from the above-described issue of the data transmission time. Namely, if the remote center backs up the data of a plurality of disk subsystems of the main center, there occurs an issue (order integrity) that disk subsystems are required to be in one-to-one correspondence. In asynchronous remote copy, it is inevitable that reflection of renewal data in the remote center is delayed from the time when an actual renewal process is executed in the main center. However, the order of renewal in the remote center is required to be the same as that in the main center.

A database or the like is generally constituted of a main body of the database and various log and control information directly associated with the main body. When data is renewed, not only the database main body but also the log and control information is renewed to maintain the system integrity. Therefore, if the renewal order is not kept, the integrity of information regarding the renewal order is also lost, and at the worst the whole of the database may be destructed.

"Involvement of Host Computer"

In the asynchronous remote copy under general environments where the main and remote centers have a plurality of disk subsystems, when the host computer instructs the disk subsystem to renew data, it is common that the host computer adds renewal order information such as a time stamp to the data to make the corresponding disk subsystem in the remote center execute a renewal data reflection process in accordance with the added information.

According to the remote copy function disclosed, for example, in the publication of JP-A-6-290125 (U.S. Pat. No. 5,446,871), generation and supply of renewal order information and a renewal data reflection process based upon this information are realized through the cooperation between the operating system of a host computer in a main center and its disk subsystems and the operating system of a host computer in a remote center and its disk subsystems.

SUMMARY OF THE INVENTION

This prior art can realize the asynchronous remote copy function while ensuring the renewal order between main and remote centers. With this prior art, however, both the upper level software and a disk subsystem are required to have the mechanism for realizing the remote copy function, and also they are required to operate in cooperation. Since new custom software is required to be incorporated, a user is necessary to perform works such as software incorporation, setting and check, and modification of system designs to be caused by an increased CPU load. Incorporation of this conventional function is, therefore, associated with some obstacles such as a predetermined work period for such preparation and a cost therefor.

If the asynchronous remote copy function is executed when the capacity of the communication line to a remote center is not sufficient, renewal data not reflected upon the remote center increases.

It is an object of the present invention to realize an asynchronous type remote copy function capable of ensuring a renewal order and data integrity and facilitating its incorporation with less performance degradation of a main center, by using only the function of a disk subsystem without incorporating new software.

It is another object of the present invention to realize a remote copy function without incurring an expensive line subscription fee upon a customer of a disk subsystem, by applying an asynchronous type remote copy function to the disk subsystem capable of storing a large amount of data.

Each of a main center and a remote center is provided with a disk subsystem serving as a gateway (hereinafter called a gateway subsystem) which is connected to a data transmission line. All disk subsystems in both the centers to which a remote copy is executed, are connected to the corresponding gateway subsystem of each center. A volume of the disk subsystem in the main center to be remotely copied and a desired volume of the gateway subsystem in the main center are coupled by a synchronous type remote function to mirror data. If a system process time delay or the like can be neglected between the volume of the disk subsystem in the main center to be remotely copied and the volume of the gateway subsystem in the main center, data consistency can be retained.

Data is mirrored between volumes of the gateway subsystems of the main and remote centers through asynchronous remote copy. In this case, the gateway subsystem of the main center sends renewal data to the gateway subsystem of the remote center in accordance with the renewal order of volumes of disk subsystems of the main center, whereas the gateway subsystem of the remote center reflects the renewal data upon corresponding volumes of the remote center in accordance with the reception order of the renewal data.

Data is mirrored between the volume of the gateway subsystem of the remote center and the volume of each disk subsystem through synchronous remote copy. Data same as from a macro viewpoint is always stored in the volume of the gateway subsystem of the remote center and in the volume of the disk subsystem to be remotely copied.

The gateway subsystem stores data in the volume to be remotely copied, in a buffer memory of the gateway subsystem. Since the gateway subsystem has the buffer memory, generally an area for storing data in the gateway subsystem is not necessarily required. However, if there is an available area in the gateway subsystem, this area can be utilized for data transfer via the transmission line, depending upon the capacity of the transmission line.

With the above-described configuration, it is possible to mirror data between a plurality of disk subsystems of the main center and a plurality of disk subsystems of the remote center, by using the functions of the disk subsystems, while the data renewal order is retained. Reflection of renewal data upon the remote center can be performed asynchronously with the data renewal process at each disk subsystem of the main center. It is therefore possible to provide a disaster resistant back-up system of high performance and easy incorporation. Depending upon the communication capacity of the transmission line, the storage area of the subsystem can be utilized so that a burden of a line subscription fee of a customer can be reduced.

DESCRIPTION OF THE EMBODIMENTS

An embodiment of the invention applied to a general computer system will be described with reference to the accompanying drawings.

Figure 1:
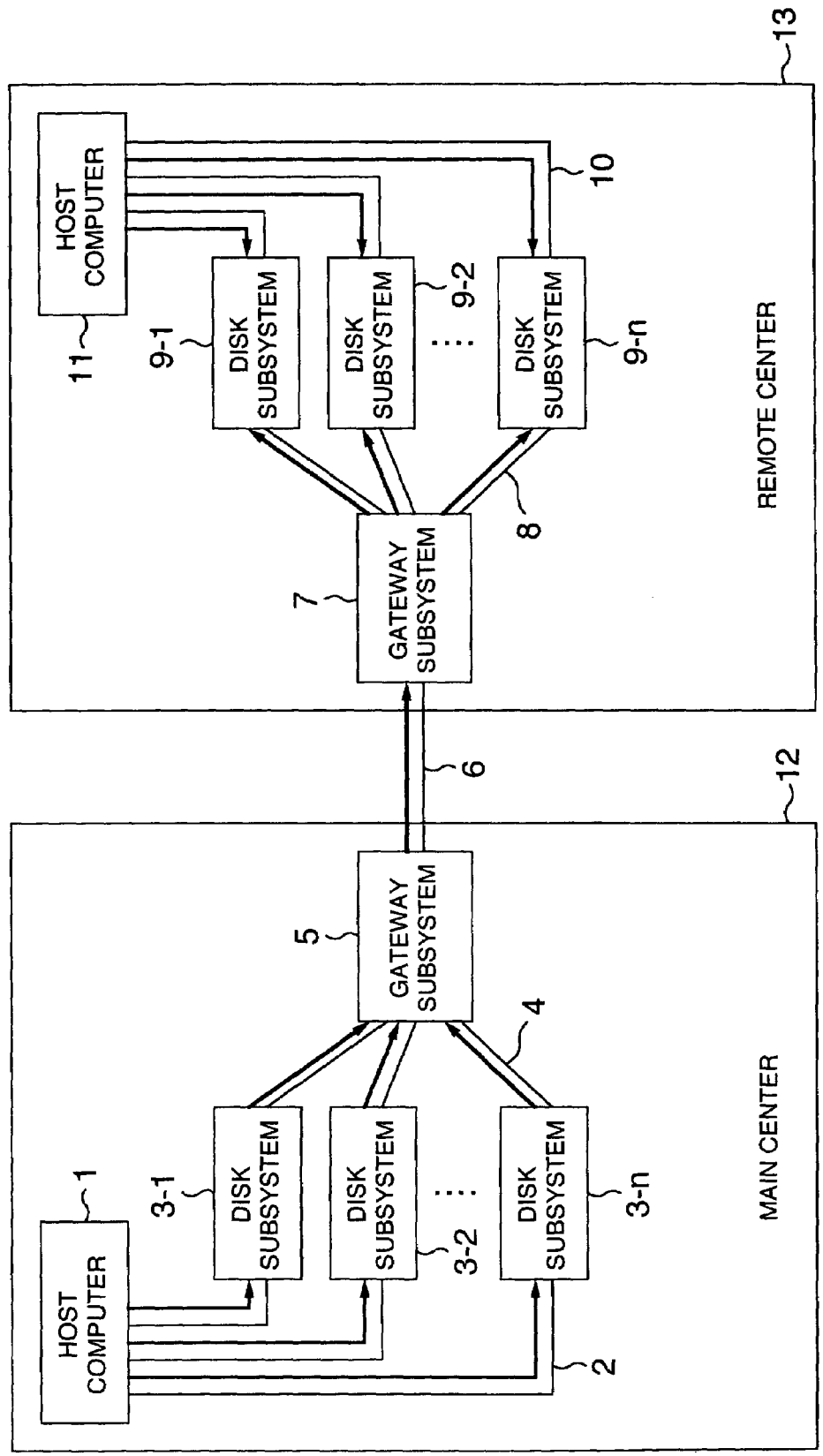
FIG. 1 is a diagram showing the overall structure of a remote copy system according to an embodiment of the invention.

FIG. 1 shows an example of the structure of a system embodying this invention and allowing data to be mirrored between arbitrary two data centers among a plurality of data centers each provided with a general computer system.

One or a plurality of disk subsystems in a main center and one or a plurality of disk subsystems in a remote center are interconnected via gateway subsystems without involving the host computers, to realize a remote copy system for mirroring data between both the centers.

In the main center 12 shown in FIG. 1, a central processing unit (host computer) 1 is connected via interface cables 2 to disk subsystems 3-1, 3-2, . . . , 3-*n*. The disk subsystems 3-1, 3-2, . . . , 3-*n* store data to be referred to, or renewed, by the host computer 1. The gateway subsystem 5 is connected via interface cables 4 to the disk subsystems 3-1 to 3-*n*.

The gateway subsystem 7 is provided in the remote center 13 and connected via an interface cable 6 to the gateway subsystem 5 of the main center 12. The interface cable 6 is connectable to a general communication line. In this embodiment, therefore, the interface cable 6 is intended to include such a function.

When the host computer 1 issues a data write request to a disk subsystem 3-1 or the like, the disk subsystem 3-1 or the like writes the data in its buffer memory. Synchronously with this timing the disk subsystem 3-1 or the like issues a data write request to the gateway subsystem 5.

Upon reception of this write request, the gateway subsystem 5 writes the data in its buffer memory. Asynchronously with the data write in the buffer memory of the gateway subsystem 5, the gateway subsystem 5 issues a data write request to the gateway subsystem 7 at the remote site. It is essential to use a gateway subsystem 5 irrespective of how many disk subsystems 3-1 to 3-n are used.

The gateway subsystem 7 stores data supplied from the gateway subsystem 5 in its buffer memory, in the order of data write requests. It is essential to use a gateway subsystem 7.

Disk subsystems 9-1, 9-2, . . . , 9-n are connected via interface cables 8 to the gateway subsystem 7. When a data write request is issued from the main center 12 to the gateway subsystem 7, synchronously with this timing the gateway subsystem 7 writes the data therein and in the disk subsystem 9-1.

Remote copy is therefore executed by sequentially issuing a write request to a subsystem and then to the next subsystem. When a data write request is issued from the host computer 1 to one or a plurality of disk subsystems 3-1 to 3-n, the same data is loaded in one or a plurality of disk subsystems 9-1 to 9-n of the remote center 13. Arrows shown in FIG. 1 indicate the flow of the data instructed to be written by the host computer 1.

In the remote center 13, the host computer 11 is connected via interface cables 10 to the disk subsystems 9-1 to 9-n, and is a central processing unit which executes data reference and renewal relative to the disk subsystem 9-1 or the like. When the host computer 1 of the main center 12 cannot provide its intrinsic functions because of disasters, system failures or the like, the host computer 11 can operate as an alternative to the host computer 1. In addition, the host computer 11 can execute a process different from that of the host computer 1 of the main center 12 by using data stored in the disk subsystem 9-1 or the like, independently from the operation of the host computer 1. However, if the host computer 11 does not execute a process by using the disk subsystem 9-1, this host computer 11 is unnecessary.

Figure 2:
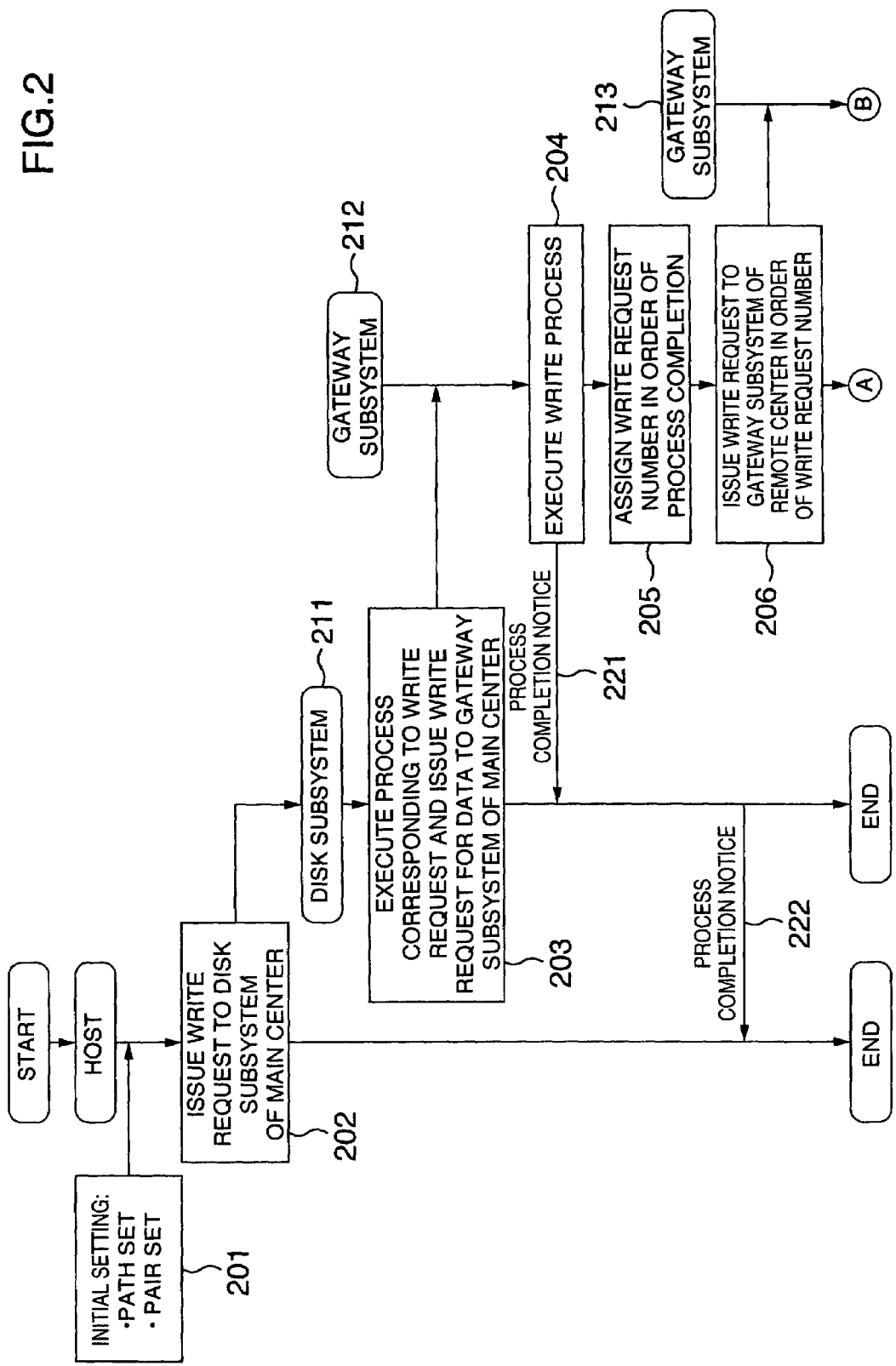
FIG. 2 is a flow chart illustrating the details of an operation of the remote copy system.
Figure 3:
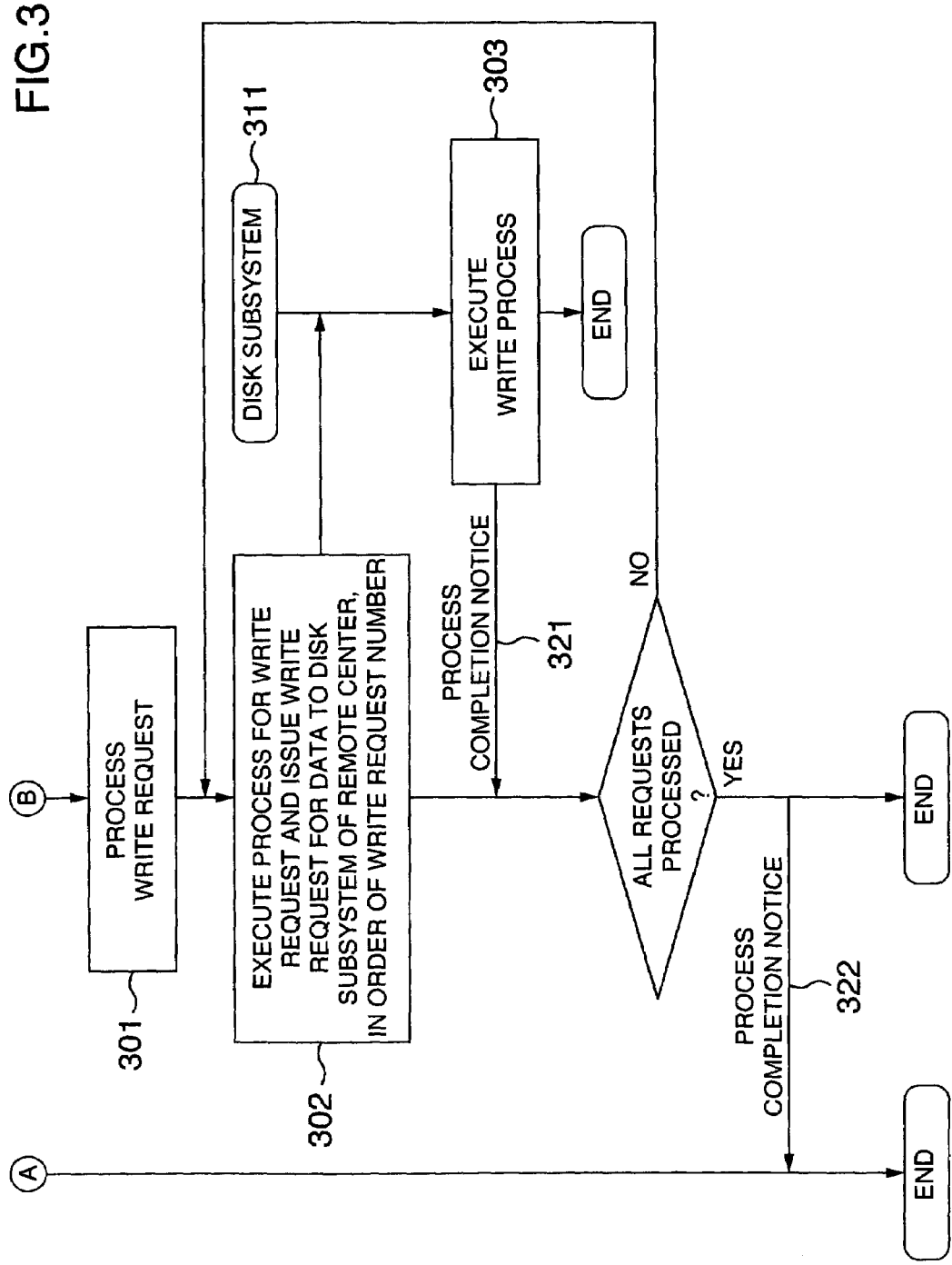
FIG. 3 is a flow chart illustrating the details of an operation of the remote copy system to follow the flow chart of FIG. 2.

The outline of the data mirroring method and operation according to the embodiment of this invention will be described with reference to FIGS. 2 and 3. A volume, a data set and a disk subsystem which store data to be mirrored are preselected by an administrator. The relation between the volume, data set and disk subsystem in which the data is stored and a volume, a data set and a disk subsystem which store a copy of the data, is preset to the disk subsystems by the administrator from the host computers.

In other words, a write destination of data to be copied is determined sequentially between respective disk subsystems described above. For example, when data is written in a volume of the disk subsystem 3-1, it is set in such a manner that in which volume of the gateway subsystem 5 the data is written from the disk subsystem 3-1, then in which volume of the gateway subsystem 7 the data is written from the gateway subsystem 5, lastly in which volume of the disk subsystem 9-1 the data is written from the gateway subsystem 7. Such settings are provided for each disk subsystem including the gateway disk subsystem.

For such settings, the serial number and volume of each disk subsystem are used. For example, a volume A of the disk subsystem 3-1 is set to a volume B of the gateway subsystem 5, the volume B of the gateway subsystem 5 is set to a volume C of the gateway subsystem 7, and the volume C of the gateway subsystem 7 is set to a volume D of the disk subsystem 9-1. In this manner, the data written in the volume A of the disk subsystem 3-1 is copied to the volume D of the disk subsystem 9-1. This setting is conducted for all volumes.

Such preselect and preset may be effected by using a console or a service processor without using the host computer, if the disk subsystem can be connected to or provided with its console or service processor. The flow chart shown in FIG. 2 illustrates the operation assuming that the host computer is used for such preselect and preset. For such preset, a specific address indicating the volume or disk subsystem may be designated, or the volume or disk subsystem in an arbitrary address range may be selected by using a control program in the disk subsystem. Path setting and pair setting are used as an example of initial setting (FIG. 2, 201).

The further description will be given with reference to the accompanying drawings.

As the host computer 1 (FIG. 1) issues a data write request (hereinafter called a write command) to the disk subsystem 3-1, 3-2, . . . , 3-n (211) (FIG. 2, 202), the disk subsystem 3-1, 3-2, . . . , 3-n executes a data load process for loading the write data therein in response to the write command, and also issues a write command for the data to the gateway subsystem 5 (212) (203). The write command is a command for transferring an instruction of data write and the write data itself.

Upon reception of the write command, the gateway subsystem 5 executes a process corresponding to the write command (204). After the gateway subsystem completes a data load process for loading the data in its buffer memory, it notifies a process completion to the disk subsystem 3-1, 3-2, . . . , 3-2 (211). A write command number is assigned to each write command in the order of the process completion (205), and at the timing determined basing upon the processing capability of the gateway subsystem 5, the write command assigned the write command number is issued to the gateway subsystem 7 (213) in the order of the write command number (206).

Under the conditions that the disk subsystem 3-1, 3-2, . . . , 3-n completes a process for the write command issued from the host computer 1, i.e., completes a data load process for loading the data therein, and receives a write process completion notice from the gateway subsystem 5 (212) (221), the disk subsystem supplies a write command process completion notice to the host computer 1 (222).

The gateway subsystem 7 (213) confirms, from the write command numbers assigned to respective write commands issued from the gateway subsystem 5 (212), whether the write commands have been received in the order of the assigned write command numbers. Thereafter, the gateway subsystem executes the processes corresponding to the write commands, i.e., executes a data load process (301) for loading the data in its buffer memory. Thereafter, a write command corresponding to the loaded data is issued to the corresponding disk subsystem 9 (311) (302). Upon reception of the write command issued from the gateway subsystem 7, the disk subsystem 9 (311) executes a process corresponding to the write command, i.e., executes a data load process for loading the data therein (303).

After the disk subsystem 9-1, 9-2, . . . , 9-n (311) completes the process corresponding to the write command, i.e., completes the data load process for loading the data in its buffer memory, it supplies a process completion notice to the gateway subsystem 7 (321). Under the conditions that the gateway subsystem 7 (213) completes the data load process for loading the data therein and receives the write process completion notice from the disk subsystem 9-1, 9-2, . . . , 9-n, the gateway subsystem 7 supplies a process completion notice for the write command to the gateway subsystem 5 (322).

According to the present invention, data written by the host computer 1 is mirrored between the disk subsystem 3-1, 3-2, . . . , 3-n and the gateway subsystem 5 and is maintained consistent from a macro viewpoint. At this time, the gateway subsystem 5 adds information (serial number) to the data in order to hold the renewal order.

Data is mirrored between the gateway subsystems 5 and 7 through asynchronous remote copy while the renewal order is ensured. Synchronously with the data renewal by the gateway subsystem 7, the disk subsystem 9-1, 9-2, . . . , 9-n renews the data. These operations are all realized by only the functions of the disk subsystem including a disk subsystem having the gateway function so that any load is not applied to the processing performance of the host computer.

Figure 4:
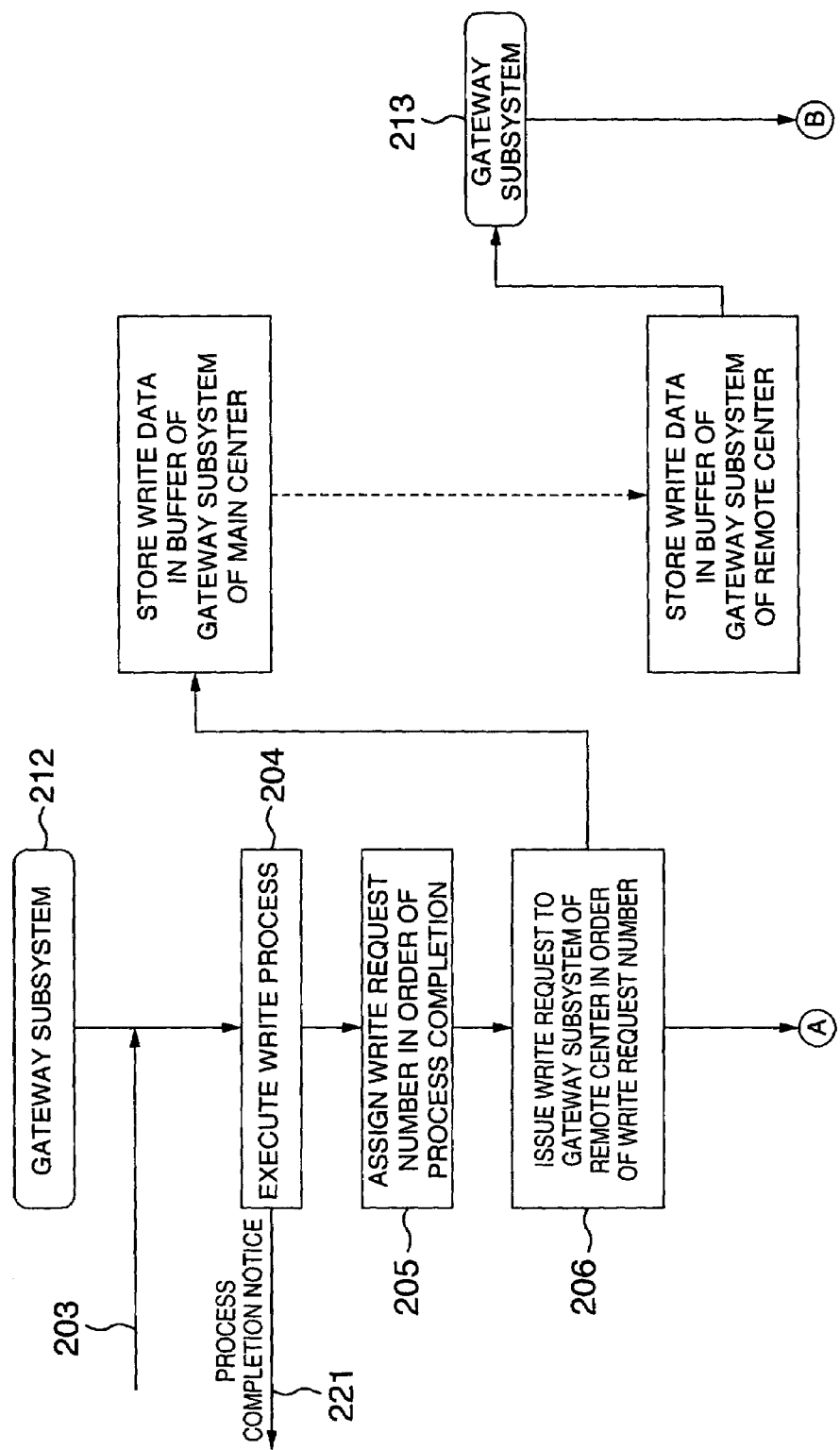
FIG. 4 is a flow chart illustrating the operation of a remote copy system having a gateway subsystem provided with a buffer area.

The operation of the remote computer system which uses a buffer area of each gateway subsystem when the communication capacity of the transmission line is not sufficient, will be described with reference to FIG. 4. In FIG. 4, blocks having identical reference numerals to those shown in FIGS. 2 and 3 have been already described above. In this system, a buffer area for temporarily storing write data is provided at each gateway subsystem in order to prevent an overflow of a buffer memory for a general transmission line. Data stored in the buffer area of the subsystem is sent from the main center 12 to the remote center 13 via the transmission line, and to the gateway subsystem via the buffer area on the side of the remote center 12. Although time consistency for mirroring is degraded, the asynchronous type remote copy function can be realized without using a high capacity communication line.

Figure 5:
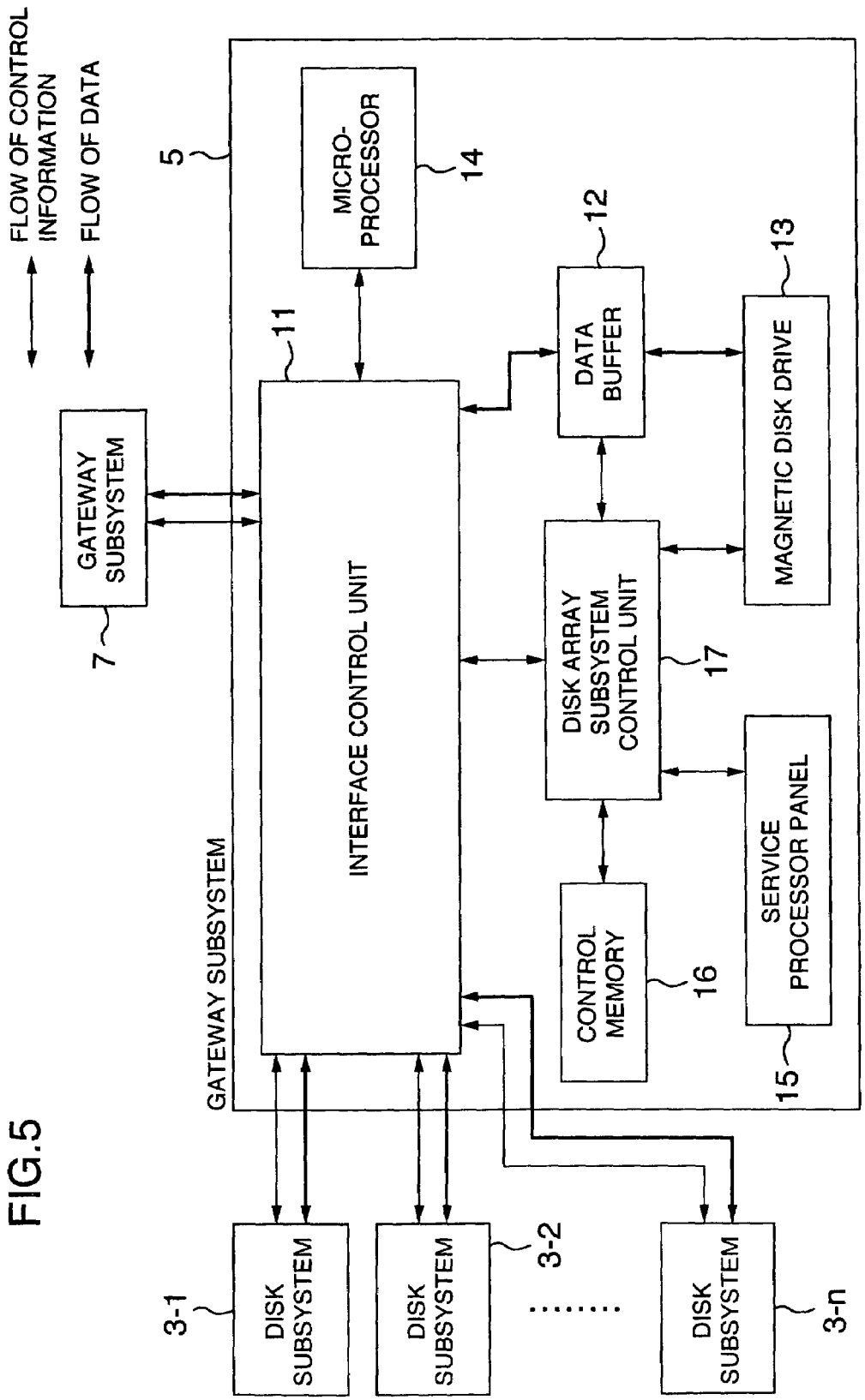
FIG. 5 is a diagram showing the internal structure of a gateway subsystem.

FIG. 5 shows the structure of the gateway subsystem 5. The structure of the gateway subsystem 7 is the same as the gateway subsystem 5.

The gateway subsystem 5 has: an interface control unit 11 for data (including information) transfer to and from the disk subsystem 3-1 or the like and the gateway subsystem 7; a data buffer 12 for temporarily storing the data; a magnetic disk drive 13 as a storage medium for storing the data; a control memory for storing remote copy status information (as to which volume of which disk subsystem is written to which volume of the gateway subsystem 5, as to which volume of the gateway subsystem 5 is written in which volume of the gateway subsystem, and the like); a microprocessor 14 for controlling transfer of these data; a service processor panel 15 allowing a user to set how the remote copy is executed; and a disk array subsystem control unit 17 for controlling these components. In this example, although the data buffer 12 is provided at the gateway subsystem 12, this data buffer 12 is not necessary if a cache memory capable of performing a similar function to the data buffer 12 is provided, because the cache memory can function as the data buffer 12. In this specification, therefore, the data buffer 12 is intended to be inclusive of such a cache memory. Also in this example, although the control memory 16 is provided at the gateway subsystems, this control memory 16 is not necessary if a remote copy control information storage unit capable of performing a similar function to the control memory 16 is provided, because the remote copy information storage unit can function as the control memory 16. In this specification, therefore, the control memory 16 is intended to be inclusive of such a remote copy information storage unit.

As described so far, according to the present invention, an asynchronous type remote copy system can be realized which can ensure the data renewal order and data integrity by using the functions of disk subsystems without incorporating new software and which is easy to be incorporated and free from degradation of the process performance of the main center.

A storage area of the subsystem can be used depending upon the communication capacity of the transmission line so that a burden of a line subscription fee of a customer can be reduced.

What is claimed is:

1. A plurality of storage systems comprising:
  a first storage system including a first controller controlling a first write request received from at least one host computer, and a first storage storing data under control by said first controller;
  a second storage system including a second controller controlling a second write request received from at least one host computer, and a second storage storing data under control by said second controller;
  a third storage system connected to said first storage system and said second storage system, said third storage system comprises:
  a third controller controlling data received from said first storage system synchronously and controlling data received from said second storage system synchronously, and
  a third storage storing data under control by said third controller; and
  a fourth storage system connected to said third storage system, said fourth storage system comprises:
  a fourth controller controlling data received from said third storage system asynchronously, and
  a fourth storage storing data under control by said fourth controller.

2. A plurality of storage systems according to claim 1, wherein said first controller of said first storage system receives the first write request, sends a copy of data requested by the first write request to said third storage system, stores data requested by the first write request into said first storage, and receives an indication of completion of receipt of the copy of data requested by the first write request from said third controller of said third storage system, and
  wherein said third controller of said third storage system receives the copy of data requested by the first write request from said first storage controller of said first storage system, sends the indication of completion of receipt of the copy of data requested by the first write request to the first controller of said first storage system, and stores the copy of data requested by the first write request into said third storage.

3. A plurality of storage systems according to claim 2, wherein said first controller of said first storage system sends a copy of data requested by the first write request to said third storage system, after said first controller of said first storage system stores data requested by the first write request into said first storage.

4. A plurality of storage systems according to claim 2, wherein said third controller of said third storage system sends the indication of completion of receipt of the copy of data requested by the first write request to said first controller of said first storage system, after said third controller of said third storage system stores the copy of data requested by the first write request into said third storage.

5. A plurality of storage systems according to claim 2, wherein said first controller of said first storage system sends an indication of completion of processing, after said first controller of said first storage system receives the indication of completion of receipt of the copy of data requested by the first write request from said third controller of said third storage.

6. A plurality of storage systems according to claim 1, wherein said second controller of said second storage system receives the second write request, sends a copy of data requested by the second write request to said third storage system, stores data requested by the second write request into said second storage, and receives an indication of completion of receipt of the copy of data requested by the second write request from said third controller of said third storage system, and wherein said third controller of said third storage system receiving the copy of data requested by the second write request from said second storage controller of said second storage system, and sends the indication of completion of receipt of the copy of data requested by the second write request to the second controller of said second storage system, and stores the copy of data requested by the second write request into said third storage.

7. A plurality of storage systems according to claim 6, wherein said second controller of said second storage system sends a copy of data requested by the second write request to said third storage system, after said second controller of said second storage system stores data requested by the second write request into said second storage.

8. A plurality of storage systems according to claim 6, wherein said third controller of said third storage system sends the indication of completion of receipt of the copy of data requested by the second write request to the second controller of said second storage system, after said third controller of said third storage system stores the copy of data requested by the second write request into said third storage.

9. A plurality of storage systems according to claim 6, wherein said second controller of said second storage system sends an indication of completion of processing, after said second controller of said second storage system receives the indication of completion of receipt of the copy of data requested by the second write request from said third controller of said third storage.

10. A plurality of storage systems according to claim 1, wherein said third controller of said third storage system receives data from said first storage system, sends a copy of data received from the first storage system to said forth storage system, stores data received from the first storage system into said third storage, and receives an indication of completion of receipt of the copy of data received from the first storage system, from said fourth controller of said fourth storage system, and wherein said forth controller of said fourth storage system receives the copy of data received from the first storage system, from said third storage controller of said third storage system, sends an indication of completion of receipt of the copy of data received from the first storage system to the third controller of said third storage system, and stores the copy of data received from the first storage system into said fourth storage.

11. A plurality of storage systems according to claim 10, wherein said third controller of said third storage system sends a copy of data received from the first storage system to said fourth storage system, after said third controller of said third storage system stores data received from the first storage system into said third storage.

12. A plurality of storage systems according to claim 10, wherein said forth controller of said fourth storage system sends the indication of completion of receipt of the copy of data received from the first storage system to the third controller of said third storage system, after said forth controller of said fourth storage system stores the copy of data received from the first storage system into said fourth storage.

13. A plurality of storage systems according to claim 10, wherein said third controller of said third storage system stores data received from the first storage system into said third storage, asynchronously with said first controller of said first storage system sending an indication of completion of processing.

14. A plurality of storage systems according to claim 10, wherein said fourth controller of said fourth storage system stores the copy of data received from the first storage system into said forth storage, asynchronously with said first controller of said first storage system sending an indication of completion of processing.

15. A plurality of storage systems according to claim 10, wherein said third controller of said third storage system receives data from said second storage system, sends a copy of data received from the second storage system to said fourth storage system, stores data received from the second storage system into said third storage, and receives an indication of completion of receipt of the copy of data received from the second storage system, from said fourth controller of said fourth storage system, and wherein said fourth controller of said fourth storage system receives the copy of data received from the second storage system, from said third storage controller of said third storage system, and send an indication of completion of receipt of the copy of data received from the second storage system to the third controller of said third storage system, and stores the copy of data received from the second storage system into said fourth storage.

16. A plurality of storage systems according to claim 15, wherein said third controller of said third storage system sends a copy of data received from the second storage system to said fourth storage system, after said third controller of said third storage system stores data received from the second storage system into said third storage.

17. A plurality of storage systems according to claim 15, wherein said fourth controller of said forth storage system sends the indication of completion of receipt of the copy of data received from the second storage system to the third controller of said third storage system, after said fourth controller of said forth storage system stores the copy of data received from the second storage system into said fourth storage.

18. A plurality of storage systems according to claim 15, wherein said third controller of said third storage system stores data received from the second storage system into said third storage, asynchronously with said second controller of said second storage system sending of an indication of completion of processing.

19. A plurality of storage systems according to claim 15, wherein said fourth controller of said fourth storage system stores the copy of data received from the second storage system into said fourth storage, asynchronously with said second controller of said second storage system sending of an indication of completion of processing.

* * * * *